(12) United States Patent
Huang et al.

(10) Patent No.: US 9,219,432 B2
(45) Date of Patent: Dec. 22, 2015

(54) CONTROL SYSTEMS AND METHODS FOR ANGLE ESTIMATION OF PERMANENT MAGNET MOTORS

(71) Applicant: SYSTEM GENERAL CORPORATION, ew Taipei (TW)

(72) Inventors: Chih-Kai Huang, Jhubei (TW); Yi-Chi Lin, Taichung (TW); Pei-Yu Chiang, New Taipei (TW)

(73) Assignee: SYSTEM GENERAL CORPORATION, New Taipei (TW)

( * ) Notice: Subject to any disclaimer, the term of this patent is extended or adjusted under 35 U.S.C. 154(b) by 236 days.

(21) Appl. No.: 13/943,966

(22) Filed: Jul. 17, 2013

(65) Prior Publication Data

US 2014/0028228 A1  Jan. 30, 2014

Related U.S. Application Data

(60) Provisional application No. 61/675,431, filed on Jul. 25, 2012.

(51) Int. Cl.
*H02P 6/00* (2006.01)
*H02P 6/16* (2006.01)
*H02P 6/18* (2006.01)
*H02P 21/00* (2006.01)
*H02P 6/08* (2006.01)
*H02P 21/14* (2006.01)

(52) U.S. Cl.
CPC ............... *H02P 6/001* (2013.01); *H02P 6/002* (2013.01); *H02P 6/08* (2013.01); *H02P 6/085* (2013.01); *H02P 6/18* (2013.01); *H02P 6/185* (2013.01); *H02P 21/00* (2013.01); *H02P 21/0035* (2013.01); *H02P 21/146* (2013.01); *H02P 2207/05* (2013.01)

(58) Field of Classification Search
CPC ............. H02P 6/18; H02P 6/185; H02P 6/08; H02P 6/085; H02P 21/00; H02P 21/0035; H02P 2207/05
USPC .......... 318/400.32, 712, 400.01, 609, 400.12, 318/400.02, 667, 799, 808
See application file for complete search history.

(56) References Cited

U.S. PATENT DOCUMENTS

| | | | | |
|---|---|---|---|---|
| 5,038,092 A | * | 8/1991 | Asano ............... | H02M 7/53875 318/799 |
| 5,627,446 A | * | 5/1997 | Deng .................... | B60L 15/025 318/799 |
| 5,726,549 A | * | 3/1998 | Okuno .................. | H02P 21/146 318/721 |
| 5,811,949 A | * | 9/1998 | Garces .............. | H02M 7/53875 318/448 |
| 5,920,161 A | * | 7/1999 | Obara et al. ................... | 318/139 |

(Continued)

*Primary Examiner* — Rita Leykin
(74) *Attorney, Agent, or Firm* — McClure, Qualey & Rodack, LLP

(57) ABSTRACT

An angle estimation control system of a permanent magnet motor is provided. The angle estimation control system includes a Clarke transform module, a Park transform module, and an angle estimation module. The Clarke transform module generates orthogonal current signals in accordance with motor phase currents. The Park transform module generates a current signal in response to the orthogonal current signals and an angle signal. The angle estimation module generates the angle signal in response to the current signal. The angle signal is related to a commutation angle of the permanent magnet motor. The current signal is controlled to be approximately equal to zero. The angle signal is further coupled to generate three phase motor voltage signals.

6 Claims, 10 Drawing Sheets

(56) References Cited

U.S. PATENT DOCUMENTS

| | | | | |
|---|---|---|---|---|
| 6,081,093 A | * | 6/2000 | Oguro | H02P 6/165 318/801 |
| 6,084,377 A | * | 7/2000 | Seok | H02M 7/53873 318/368 |
| 6,822,417 B2 | * | 11/2004 | Kawaji et al. | 318/701 |
| 7,075,264 B2 | * | 7/2006 | Huggett et al. | 318/400.02 |
| 7,218,074 B2 | * | 5/2007 | Nguyen Phuoc | H02P 1/30 318/432 |
| 7,339,346 B2 | * | 3/2008 | Ta et al. | 318/807 |
| 7,659,685 B2 | * | 2/2010 | Cesario et al. | 318/712 |
| 8,013,556 B2 | * | 9/2011 | Hattori et al. | 318/433 |

\* cited by examiner

CONTROL SYSTEMS AND METHODS FOR ANGLE ESTIMATION OF PERMANENT MAGNET MOTORS

CROSS REFERENCE TO RELATED APPLICATIONS

This application claims the benefit of U.S. Provisional Application No. 61/675,431, filed on Jul. 25, 2012, the contents of which are incorporated herein by reference.

BACKGROUND OF THE INVENTION

1. Field of the Invention

The present invention relates to a method and control system for angle estimation of sensor-less PM (permanent magnet) motors, and more particularly to a method and control system for angle estimation of brushless permanent magnet synchronous motor (PMSM).

2. Description of the Related Art

A permanent magnet synchronous motor (PMSM) includes a wound stator, a permanent magnet rotor assembly, and a sensing device to sense the rotor position. The sensing device provides signals for electronically switching the stator windings in proper sequence to maintain the rotation of the permanent magnet rotor assembly. The sensing device is a hall-sensor device in general. However, the hall-sensor device increases the cost of the permanent magnet synchronous motor and may cause the reliability problem. Therefore, a sensor-less control becomes a requirement for the PM motor control.

A permanent magnet (PM) motor offers advantages of high efficiency, small size, fast dynamic response, low noise, and high reliability, etc. The rotor field of the PM motor must be synchronous to the stator field, and, thus, field oriented control (FOC) represents the method by which one of the flux (such as rotor, stator, or air-gap) is considered as a basis for creating a reference frame for one of other flux with the purpose of decoupling the torque and flux producing components of the stator current. This means that the armature current is responsible for the torque generation, and the excitation current is responsible for the flux generation. Normally, the rotor flux is considered as a reference frame for the stator and air-gap flux. A control scheme of FOC is presented in FIG. 1. The FOC is a sensor-less FOC control system including a permanent magnet synchronous motor (PMSM) 10, a three-phase bridge driver (3-Phase Bridge) 15, and a space vector modulation module (SVM) 30. A Clarke transform module 20 is utilized to move a three-axis two-dimensional coordinate system (referenced to as the stator) onto a two-axis system.

It can be expressed as:

$ia+ib+ic=0$ $i\beta=ia$ $i\alpha=(ia+2\times ib)\div\sqrt{3}$ where ia, ib, and ic are the individual motor phase currents. iα and iβ are two-axis orthogonal currents.

A Park transform module 25 is utilized to transform the two-axis orthogonal currents iα and iβ and the angle signal θ into another two-axis system that is rotating with the rotor flux. This two-axis rotating coordinate system is called d-q axis. The angle signal θ represents the rotor angle.

$Id=i\beta\times\cos\theta+i\alpha\times\sin\theta$ $Iq=-i\beta\times\sin\theta+i\alpha\times\cos\theta$ An inverse Park transform module 35 is utilized to transform from the two-axis rotating frame d-q to the two-axis stationary frame α-β.

$V\beta=Vd\times\cos\theta-Vq\times\sin\theta$ $V\alpha=Vd\times\sin\theta+Vq\times\cos\theta$ An inverse Clarke transform module (SVM) (also referred to as a space vector modulation module) 30 is utilized to transform from the two-axis stationary frame to the three-axis stationary frame (3-phase reference frame of the stator).

$Vp1=V\beta$ $Vp2=(-V\beta+\sqrt{3}\times V\alpha)\div 2$ $Vp3=(-V\beta-\sqrt{3}\times V\alpha)\div 2$ These 3-phase (Vp1, Vp2, Vp3) are applied to generate pulse-width modulation signals, e.g. the space vector modulation (SVM) techniques.

Controllers (PI) 40 and 45 are proportional integral (PI) controllers. Each of the controllers 40 and 45 responds to an error signal in a closed control loop and attempts to adjust the controlled quantity to achieve the desired system response. The controlled parameter can be measurable system quantity such as speed, torque, or flux. The error signal is formed by subtracting the desired setting of the parameter to be controlled from the actual measured value of that parameter. The sign of the error signal indicates the direction of change required by the control input.

A sliding mode observer (SMO) 50 is used for the angle signal θ and speed estimation. FIG. 2 and FIG. 3 show a system block and an algorithm of an example of the sliding mode observer 50. The important part of the algorithm is how to calculate the commutation angle signal θ needed for the FOC. The motor position is estimated based on the measured currents and the calculated voltages. FIG. 4 shows a motor model for the PMSM 10. The motor model includes an input voltage VS that is applied to the motor composed of a winding resistance R, a winding inductance L and a back-EMF (back-electromotive force) (ES) 12. Thus, a current observer 60 in FIG. 2 and FIG. 3 can be expressed as $$\frac{d(Ise)}{dt} = \frac{-R}{L} \times Ise + \frac{1}{L} \times (VS - ES - Z)$$

where $I_S$ is the motor phase current, $I_{se}$ is the estimated phase current, VS is the input voltage, ES is the back-EMF, and Z is the output correction factor voltage.

Considering two motor representations, the same input voltage VS fed into both systems, and the measured motor phase current $I_S$ matched with the estimated phase current $I_{se}$ from the model, we can presume the back-EMF ES from the motor model is the same as the back-EMF ES from the motor. When the error value (Error/$I_S$ Error) between the measured motor phase current $I_S$ and the estimated phase current $I_{se}$ is lesser than a threshold Error-min, then the current observer 60 works in the linear range. For an error outside of the linear range, the output of the current observer 60 is (+Kslide)/(−Kslide) depending on the sign of the error value. The current observer 60 is utilized to compensate the motor model and estimate back-EMF ES by filtering (via a filter 71, such as a low pass filter (LPF)) the output correction factor voltage Z. The estimated back-EMF ES is further coupled to generate the values ($E_{SF}$) of Eα and Eβ (vector components of ES) through a filer 72 (such as a low pass filter (LPF)) for the estimated angle signal θ calculation (80).

Because the SMO (sliding mode observer) 50 requires the motor's parameters and complex calculations for the estimation of the commutation angle signal θ, thus a high-speed and expensive DSP (digital signal process) is required for the control.

BRIEF SUMMARY OF THE INVENTION

The present invention provides a simple method and approach that allows implementing the sensor-less FOC control by a low-cost general microcontroller.

An exemplary embodiment of an angle estimation control system of a permanent magnet motor is provided. The angle estimation control system comprises a Clarke transform module, a Park transform module, and an angle estimation module. The Clarke transform module generates orthogonal current signals in accordance with motor phase currents. The Park transform module generates a current signal in response to the orthogonal current signals and an angle signal. The angle estimation module generates the angle signal in response to the current signal. The angle signal is related to a commutation angle of the permanent magnet motor. The current signal is controlled to be approximately equal to zero. The angle signal is further coupled to generate three phase motor voltage signals.

Another exemplary embodiment of an angle estimation control system for angle estimation of a permanent magnet motor is provided. The angle estimation control system comprises a Clarke transform module, a Park transform module, an angle estimation module, and a sum unit. The Clarke transform module generates orthogonal current signals in accordance with motor phase currents. The Park transform module generates a current signal in response to the orthogonal current signals and a first angle signal. The angle estimation module generates the first angle signal in response to the $I_D$ current signal. The sum unit generates a second angle signal according to the first angle signal and an angle-shift signal. The current signal is controlled to be approximately equal to zero. The second angle signal is further coupled to generate three phase motor voltage signals.

Further another exemplary embodiment of an angle estimation control system for angle estimation of a permanent magnet motor is provided. The angle estimation control system comprises a Clarke transform module, a Park transform module, an angle estimation module, and a subtraction unit. The Clarke transform module generates orthogonal current signals in accordance with motor phase currents. The Park transform module generates a current signal in response to the orthogonal current signals and a first angle signal. The angle estimation module generates a second angle signal in response to the current signal. The subtraction unit generates the first angle signal according to the second angle signal and an angle-shift signal. The current signal is controlled to be approximately equal to zero. The second angle signal is further coupled to generate three phase motor voltage signals.

An exemplary embodiment of a method for angle estimation of a permanent magnet motor is provided. The method comprises the steps of generating orthogonal current signals in accordance with motor phase currents; generating a current signal in response to the orthogonal current signals and an angle signal; and generating the angle signal in response to the current signal. The angle signal is related to a commutation angle of the permanent magnet motor. The current signal is controlled to be approximately equal to zero. The angle signal is further coupled to generate three phase motor voltage signals.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
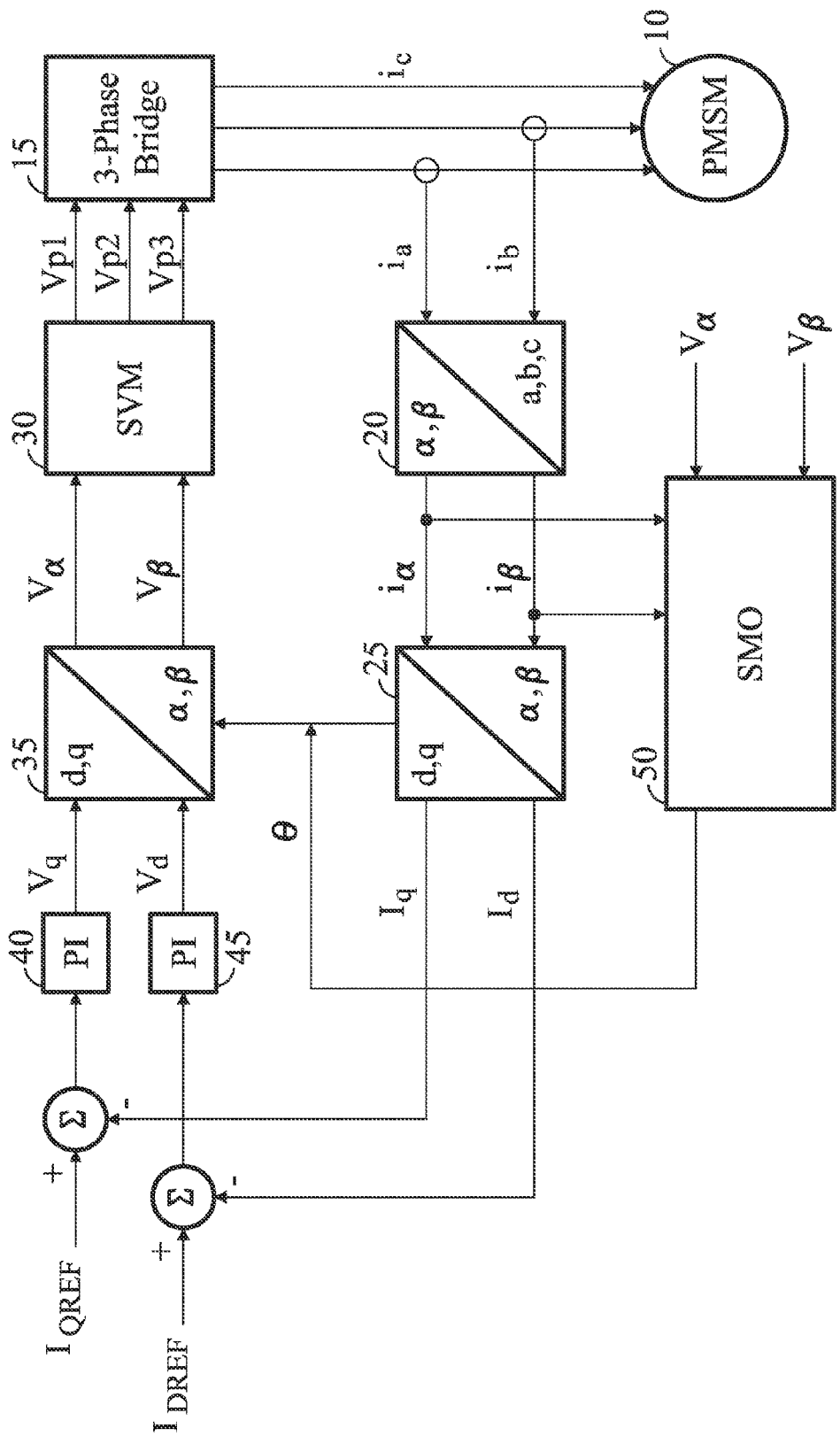
FIG. 1 shows a control scheme of field oriented control (FOC)
Figure 2:
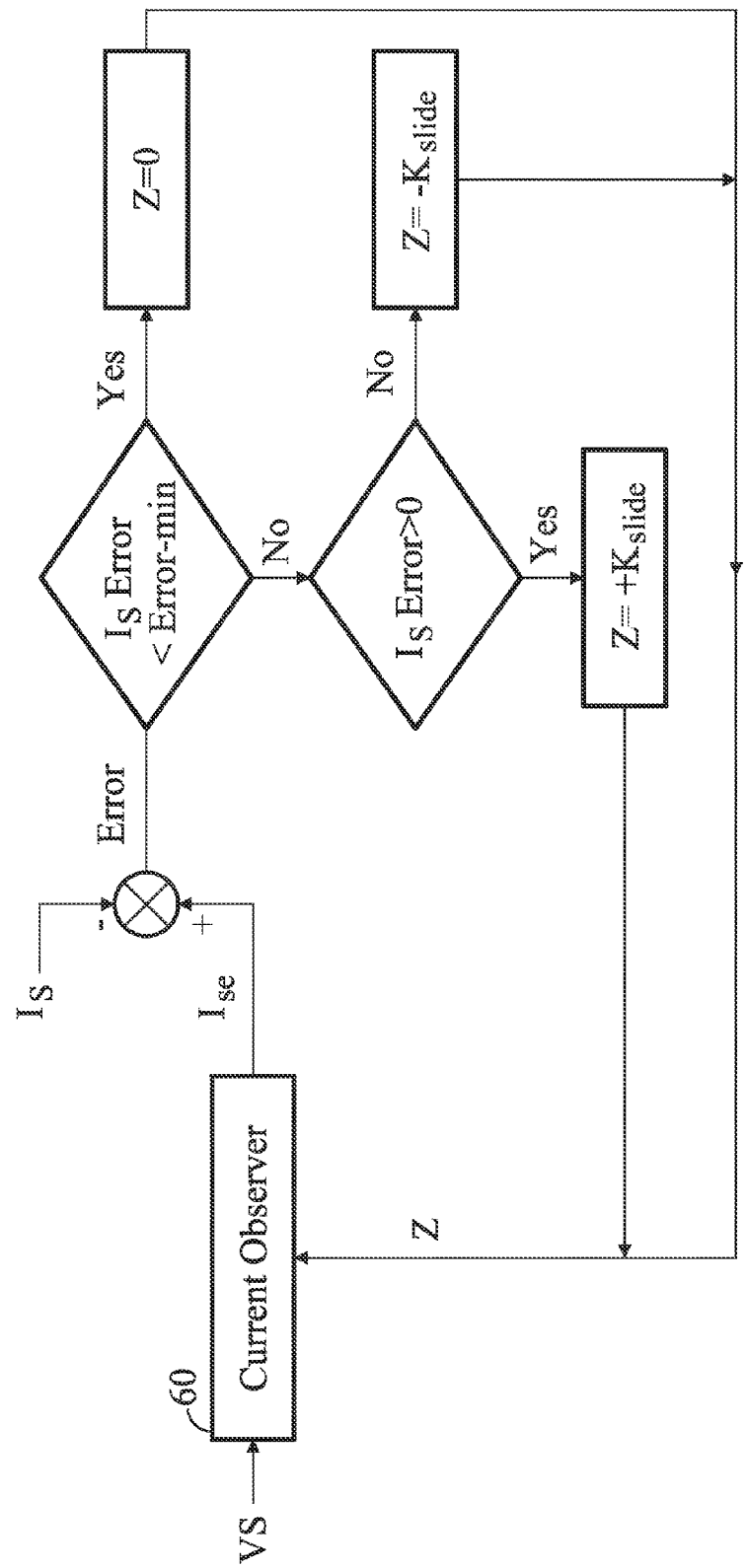
FIG. 2 shows an example of a sliding mode observer.
Figure 3:
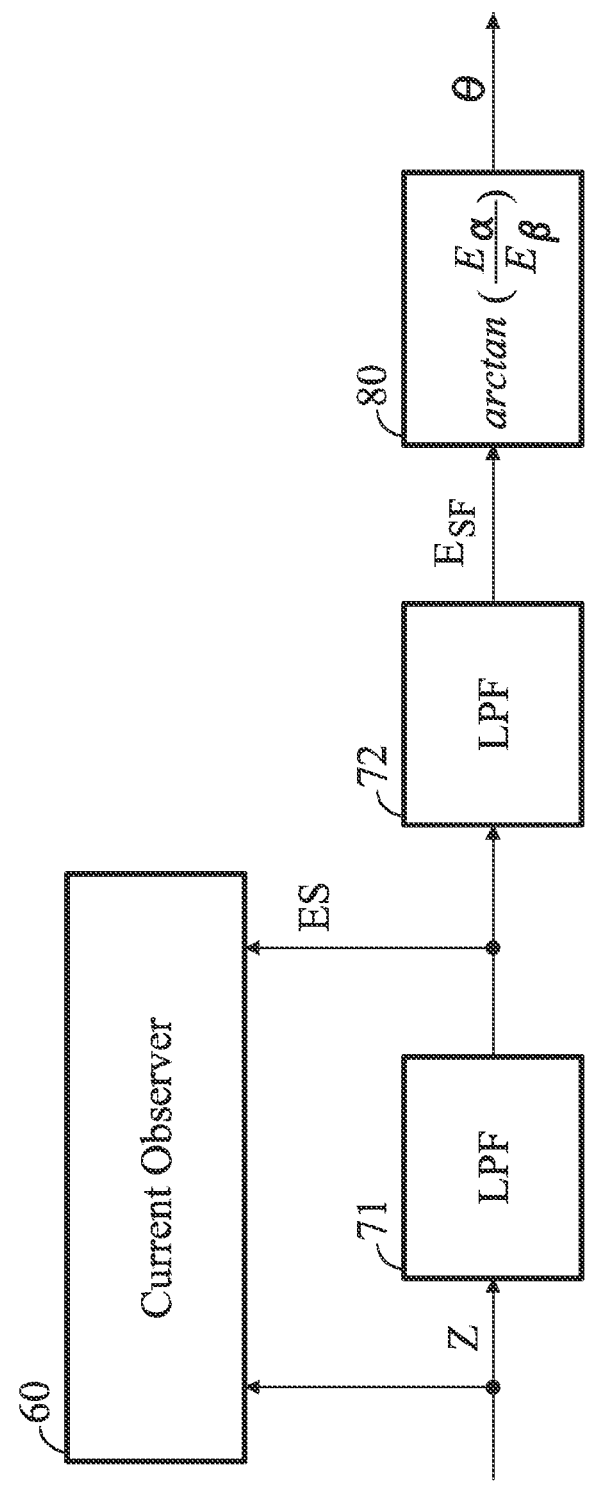
FIG. 3 shows an algorithm of an example of a sliding mode observer.
Figure 4:
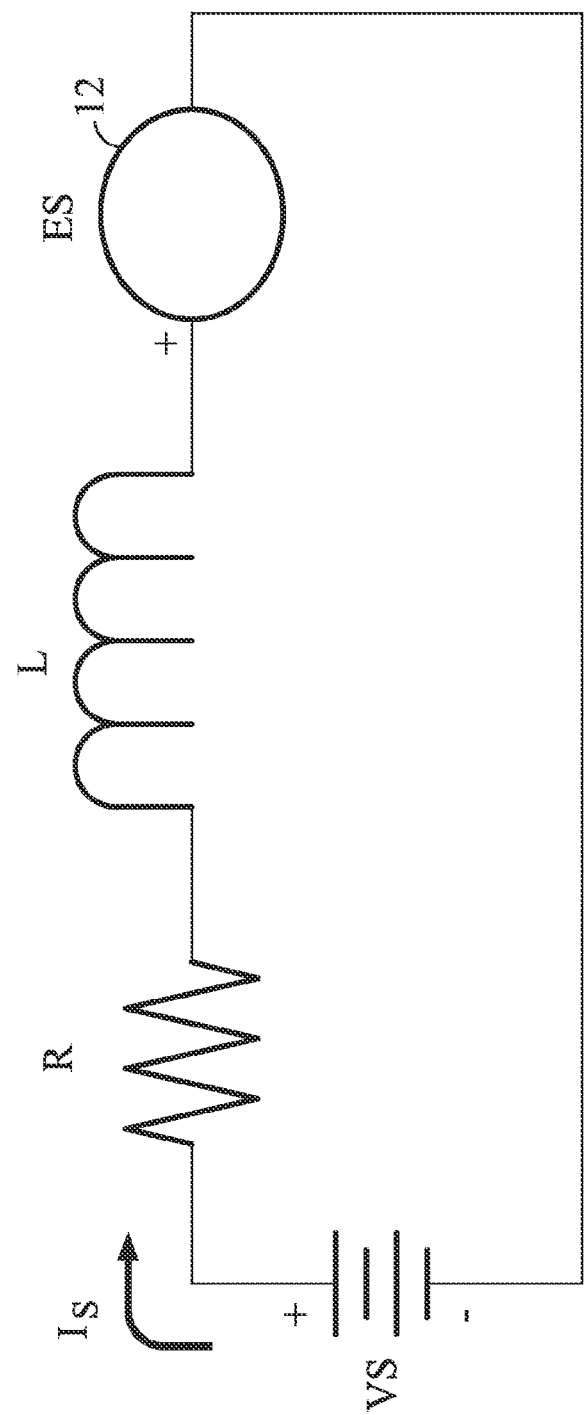
FIG. 4 shows a motor model for a permanent magnet synchronous motor (PMSM)
Figure 5:
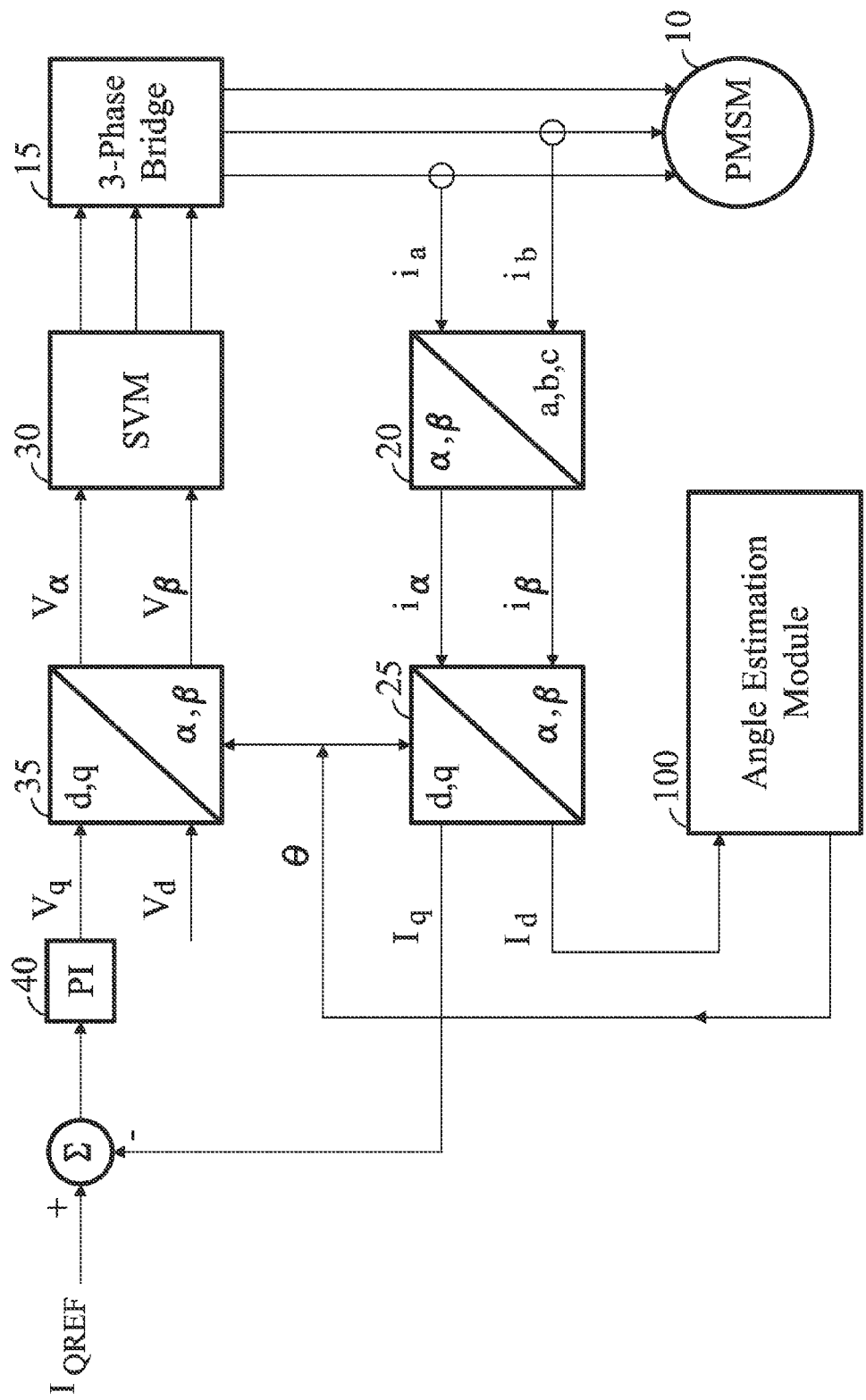
FIG. 5 shows an exemplary embodiment of an angle estimation control system of a sensor-less permanent magnet (PM) motor.

FIG. 5 is an exemplary embodiment of an angle estimation control system of a sensor-less permanent magnet (PM) motor according to the present invention. The angle estimation motor control system includes a permanent magnet synchronous motor (PMSM) 10, a three-phase bridge driver (3-Phase Bridge) 15, a space vector modulation module 30, a Clarke transform module 20, a Park transform module 25, an inverse Park transform module 35, a proportional integral controller (PI) 40, and an angle estimation module 100. The Park transform module 25 generates current signals $I_d$ and $I_q$. The angle estimation module 100 simply generates a commutation angle signal θ, which is related to the commutation angle of the PM, in accordance with the current signal $I_d$. The angle signal θ is further coupled to the Park transform module 25 and the inverse Park transform module 35 for generating pulse-width modulation signals for 3-phase motor voltage signals.

Figure 6:
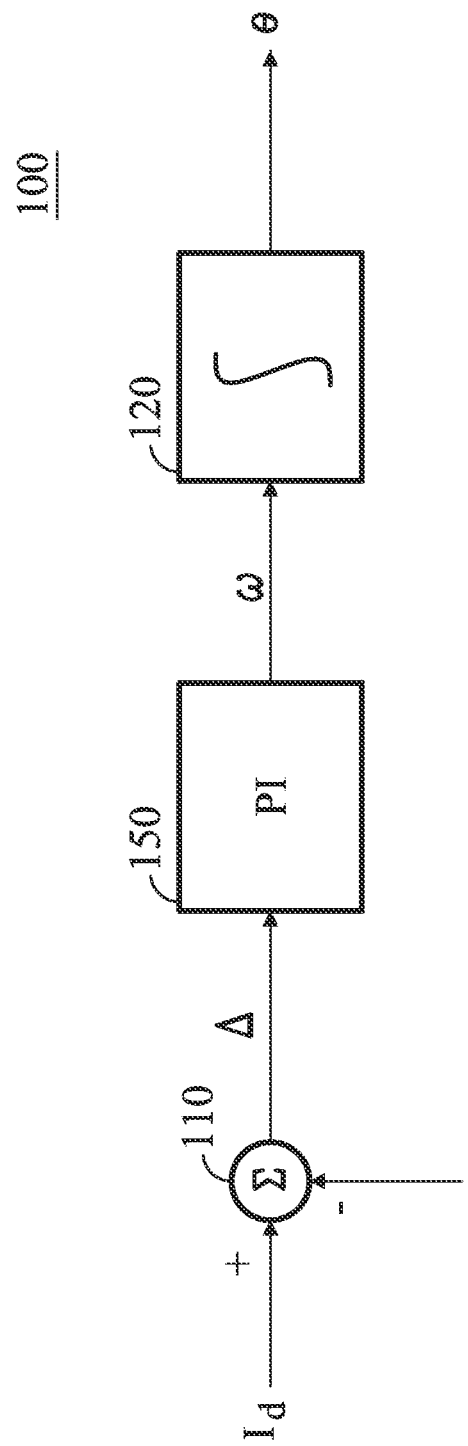
FIG. 6 shows an exemplary embodiment of an angle estimation module.

FIG. 6 is an exemplary embodiment of the angle estimation module 100 according to the present invention. The angle estimation module 100 includes a subtractor 110 for receiving the current signal $I_d$ and subtracts a predetermined value from the current signal $I_d$. The angle estimation module 100 also includes a proportional integral controller (PI) 150. Since the predetermined value is equal to zero ($\Delta = I_d - 0 = I_d$), the proportional integral controller 150 receives the current signal $I_d$ for generating a speed signal ω. The speed signal ω is derived by controlling the current signal $I_d$ to be approximately equal to zero. An integral module 120 is utilized to generate the commutation angle signal θ in accordance with the speed signal ω.

Figure 7:
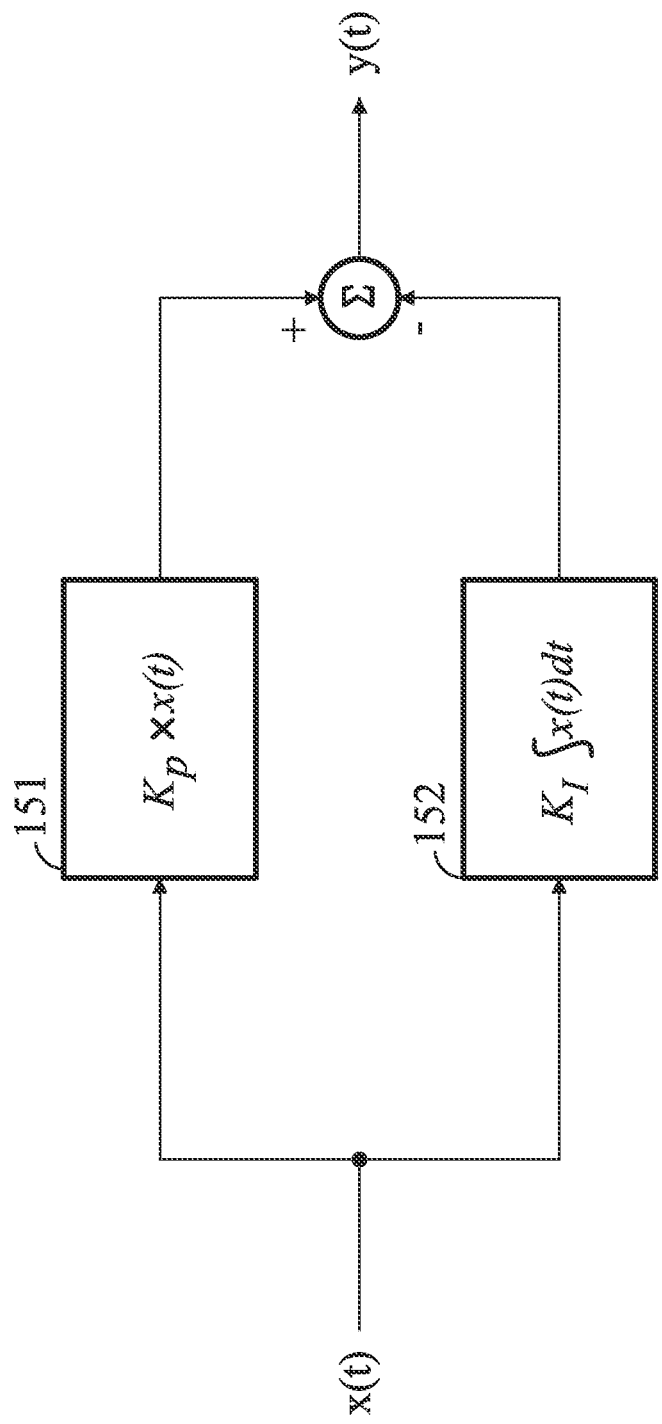
FIG. 7 shows a block diagram of an exemplary embodiment of a proportional integral controller.

FIG. 7 shows a block diagram of an exemplary embodiment of the proportional integral controller. A proportional term 151 of the proportional integral controller is formed by multiplying the input signal (error signal) by a $K_P$ gain, causing the proportional integral controller to produce a control response that is a function of the error magnitude. An integral term 152 of the proportional integral controller is utilized to eliminate small steady state errors. The integral term 152 calculates a continuous running total of the error signal. This accumulated steady state error signal is multiplied by a $K_I$ gain.

Figure 8A:
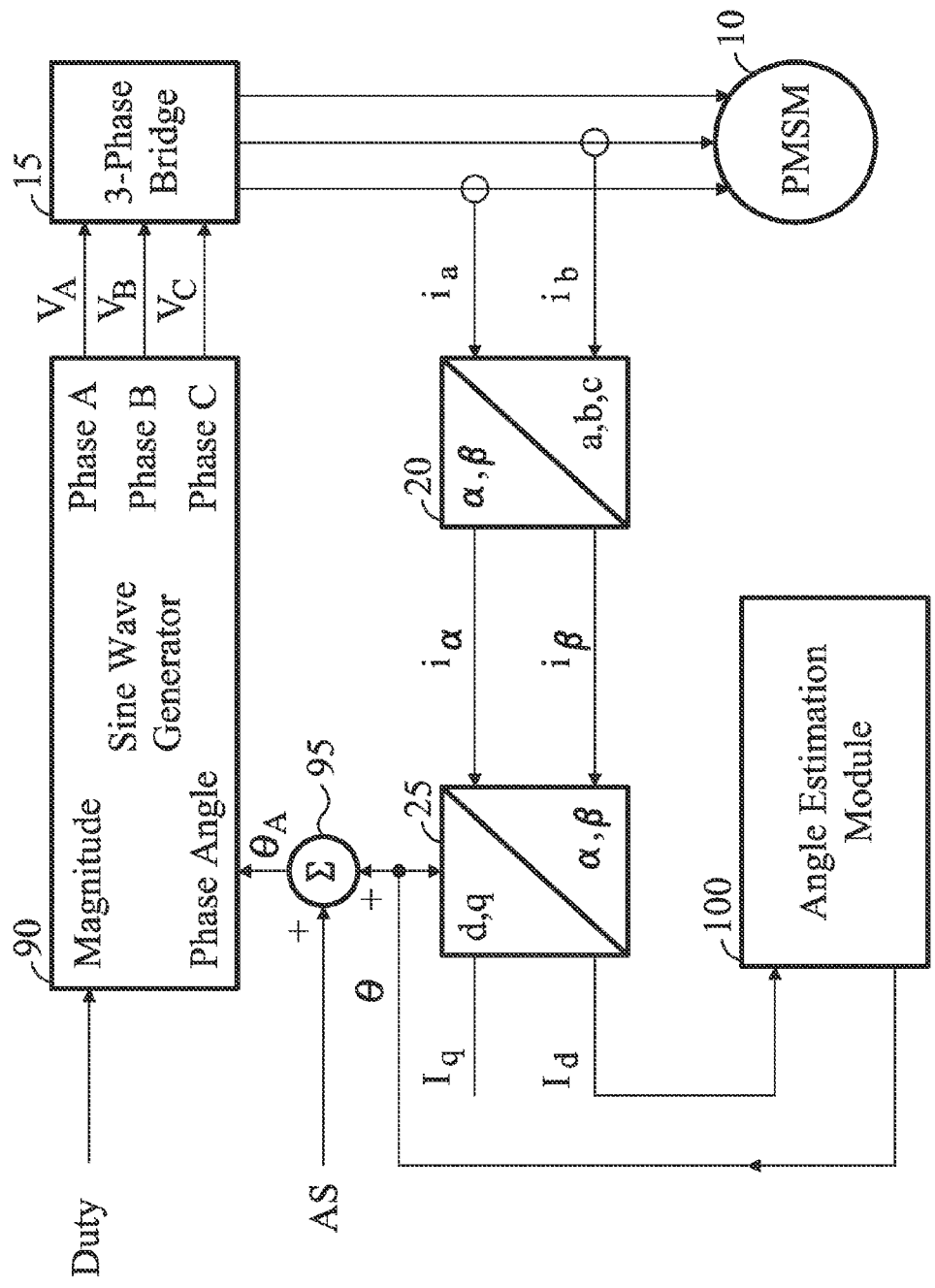
FIG. 8A shows another exemplary embodiment of an angle estimation control system of a sensor-less PM motor.

FIG. 8A is another exemplary embodiment of an angle estimation control system of a sensor-less PM motor according to the present invention. The angle estimation control system includes a permanent magnet synchronous motor (PMSM) 10, a three-phase bridge driver (3-Phase Bridge) 15, a Clarke transform module 20, a Park transform module 25, a sine-wave signal generator 90, and an angle estimation module 100. The park transform module 25 generates a current signal $I_d$. The angle estimation module 100 generates an angle signal θ in accordance with the current signal $I_d$. The angle signal θ is further feedback to the park transform module 25. A sum unit 95 generates another angle signal $θ_A$ in accordance with the angle signal θ and an angle-shift signal AS. The angle-shift signal AS is used for adapting to various PM motors, and/or for weak-magnet control.

Figure 9:
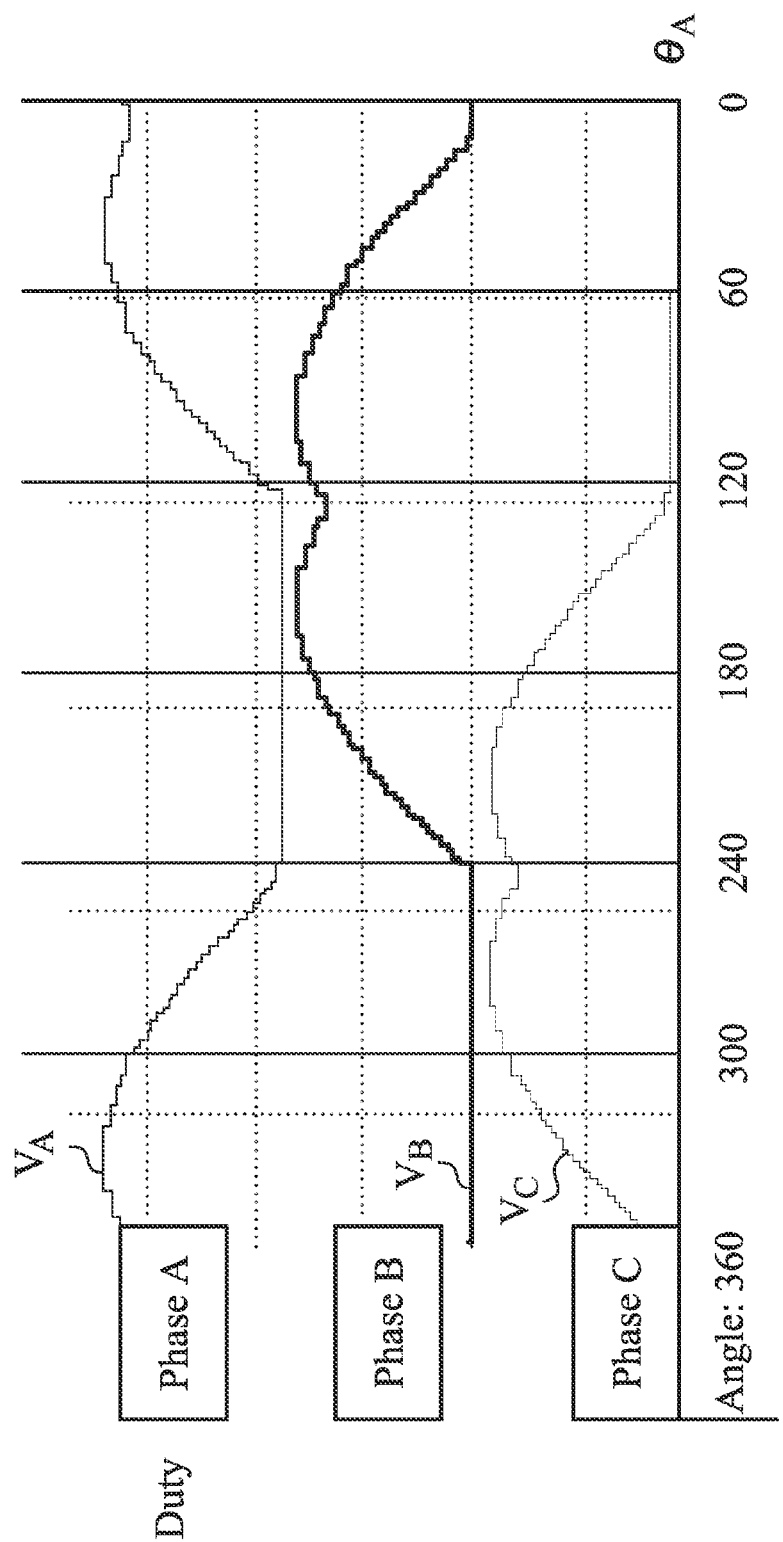
FIG. 9 shows waveforms generated by a sine-wave generator.

The angle signal θA and a duty signal Duty are coupled to the sine-wave signal generator 90 to generate pulse-width modulation signals for 3-phase (Phase A, Phase B and Phase C) motor voltage signals VA, VB, and VC. The sine-wave generator 90 has two inputs including a magnitude input (Magnitude) and a phase angle input (Phase Angle). The magnitude input is coupled to the duty signal Duty. The phase angle input is coupled to the angle signal θA. FIG. 9 shows waveforms generated by the sine-wave generator 90. The amplitude of the 3-phase motor voltage signals VA, VB, and VC is programmed by the duty signal Duty. The angle of the 3-phase motor voltage signals VA, VB, and VC is determined by the angle signal θA.

Figure 8B:
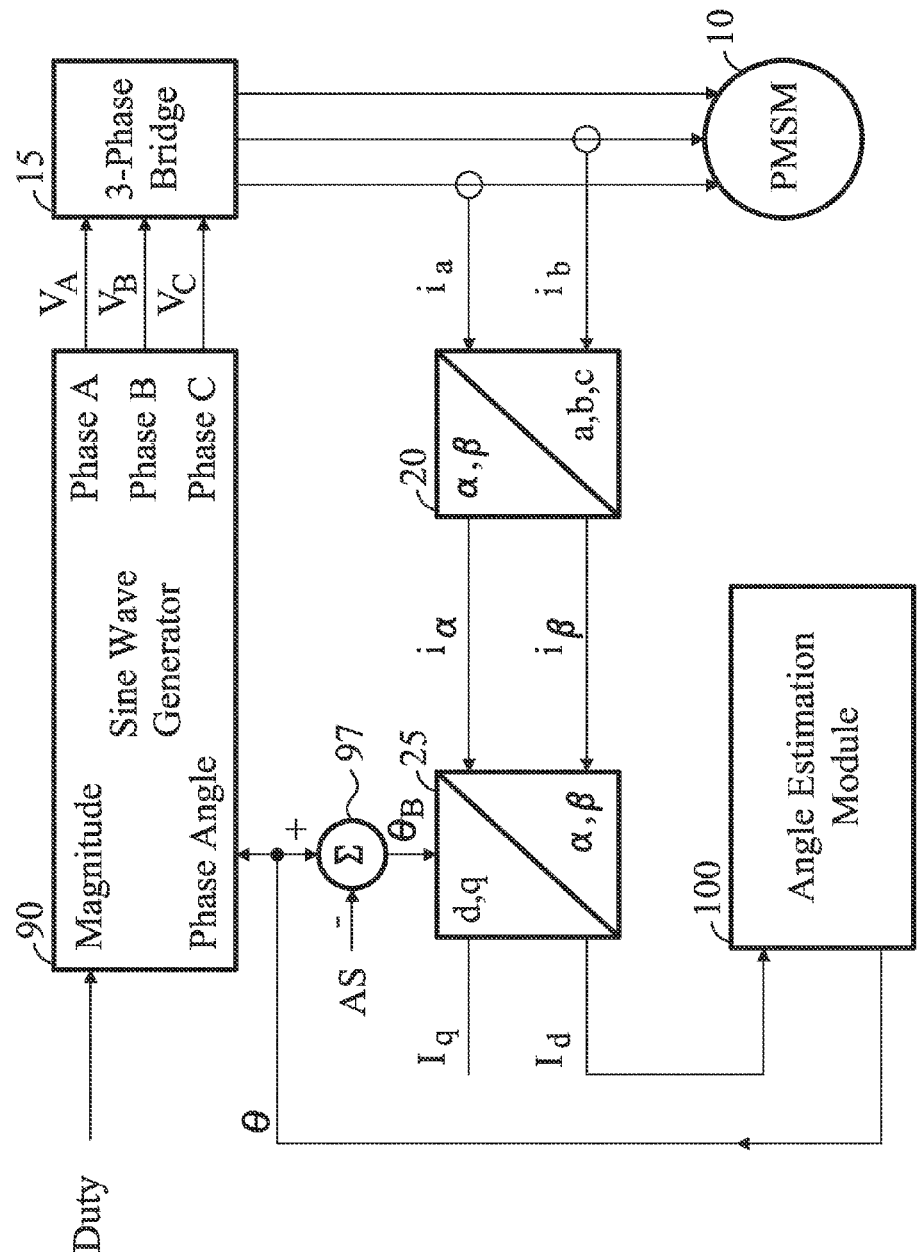
FIG. 8B shows further another exemplary embodiment of an angle estimation of a sensor-less PM motor.

FIG. 8B is further another exemplary embodiment of an angle estimation control system of a sensor-less PM motor according to the present invention. The angle estimation control system includes a permanent magnet synchronous motor (PMSM) 10, a three-phase bridge driver (3-Phase Bridge) 15, a Clarke transform module 20, a Park transform module 25, a sine-wave signal generator 90, and an angle estimation module 100. The Park transform module 25 generates a current signal $I_d$. The angle estimation module 100 generates an angle signal θ in accordance with the current signal $I_d$. The angle signal θ and a duty signal Duty are coupled to the sine-wave generator 90 to generate pulse-width modulation signals for 3-phase (Phase A, Phase B and Phase C) motor voltage signals $V_A$, $V_B$, and $V_C$. A subtraction unit 97 generates another angle signal $θ_B$ in accordance with the angle signal θ and an angle-shift signal AS. The angle signal $θ_B$ is further feedback to the Park transform module 25.

According to the description above, the present invention provides a simple method and approach that allows implementing the sensor-less FOC control by a low-cost general microcontroller.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An angle estimation control system of permanent magnet motor, comprising:
   a Clarke transform module generating orthogonal current signals in accordance with motor phase currents;
   a Park transform module generating a current signal in response to the orthogonal current signals and a first angle signal;
   an angle estimation module generating the first angle signal in response to the current signal; and
   a sum unit generating a second angle signal according to the first angle signal and an angle-shift signal;
   wherein the second angle signal is further coupled to generate three phase motor voltage signals.

2. The angle estimation control system as claimed in claim 1, further comprising:
   a sine-wave generator generating the three phase motor voltage signals in response to the second angle signal.

3. The angle estimation control system as claimed in claim 1, wherein the angle estimation module comprises:
   a proportional integral controller generating a speed signal;
   a filer generating the first angle signal in accordance with the speed signal; and
   wherein the speed signal is generated according to the current signal.

4. An angle estimation control system of a permanent magnet motor, comprising:
   a Clarke transform module generating orthogonal current signals in accordance with motor phase currents;
   a Park transform module generating a current signal in response to the orthogonal current signals and a first angle signal;
   an angle estimation module generating a second angle signal in response to the current signal; and
   a subtraction module generating the first angle signal according to the second angle signal and an angle-shift signal;
   wherein the second angle signal is further coupled to generate three phase motor voltage signals.

5. The angle estimation control system as claimed in claim 4, further comprising:
   a sine-wave generator generating the three phase motor voltages in response to the second angle signal.

6. The angle estimation control system as claimed in claim 4, wherein the angle estimation module, comprises:
   a proportional integral controller generating a speed signal;
   an integral module generating the second angle signal in accordance with the speed signal;
   wherein the speed signal is generated according to the current signal.

* * * * *